(12) United States Patent
Zhu et al.

(10) Patent No.: US 10,990,411 B2
(45) Date of Patent: Apr. 27, 2021

(54) SYSTEM AND METHOD TO INSTALL FIRMWARE VOLUMES FROM NVME BOOT PARTITION

(71) Applicant: DELL PRODUCTS, LP, Round Rock, TX (US)

(72) Inventors: Xiaomei Zhu, Round Rock, TX (US); Mick Chiu, Taoyuan (TW); Franklin Chuang, New Taipei (TW); Adolfo S. Montero, Pflugerville, TX (US); Isaac Hsu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 16/363,978

(22) Filed: Mar. 25, 2019

(65) Prior Publication Data

US 2020/0310774 A1  Oct. 1, 2020

(51) Int. Cl.
  *G06F 9/44* (2018.01)
  *G06F 9/4401* (2018.01)
  *G06F 8/61* (2018.01)

(52) U.S. Cl.
  CPC .............. *G06F 9/4401* (2013.01); *G06F 8/63* (2013.01)

(58) Field of Classification Search
  CPC .................................. G06F 8/63; G06F 9/4401
  See application file for complete search history.

(56) References Cited

U.S. PATENT DOCUMENTS

| | | | |
|---|---|---|---|
| D801,965 S | 11/2017 | Jasinski et al. | |
| 10,063,083 B2 | 8/2018 | LaMarre et al. | |
| 2002/0194313 A1* | 12/2002 | Brannock | H04L 29/06 709/220 |
| 2006/0174055 A1* | 8/2006 | Flynn | G06F 9/4406 711/100 |
| 2009/0070888 A1 | 3/2009 | Chiu | |
| 2009/0172708 A1 | 7/2009 | Cho et al. | |
| 2010/0114486 A1 | 5/2010 | Chiu | |
| 2010/0275146 A1 | 10/2010 | Chiu | |
| 2017/0199264 A1 | 7/2017 | Tsao et al. | |
| 2018/0150302 A1 | 5/2018 | Chuang et al. | |
| 2018/0253555 A1* | 9/2018 | Schumacher | G06F 21/572 |
| 2018/0267920 A1* | 9/2018 | Lin | G06F 9/4401 |

* cited by examiner

*Primary Examiner* — Stefan Stoynov
(74) *Attorney, Agent, or Firm* — Larson Newman, LLP

(57) ABSTRACT

An information handling system includes a BIOS ROM that stores a first firmware volume of BIOS code. A non-volatile memory device includes a first boot partition that stores a second firmware volume of the BIOS code. A processor executes the first and second firmware volumes during a Pre-EFI Initialization phase of a Unified Extensible Firmware Interface boot process.

18 Claims, 12 Drawing Sheets

SYSTEM AND METHOD TO INSTALL FIRMWARE VOLUMES FROM NVME BOOT PARTITION

FIELD OF THE DISCLOSURE

This disclosure generally relates to information handling systems, and more particularly relates to installing firmware volumes from an NVMe boot partition.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a Basic Input/Output System (BIOS) read-only memory (ROM) device to store a first firmware volume of BIOS code for the information handling system. A non-volatile memory device may include a first boot partition that stores a second firmware volume of the BIOS code. A processor may execute the first and second firmware volumes during a Pre-EFI Initialization (PEI) phase of a Unified Extensible Firmware Interface (UEFI) boot process.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
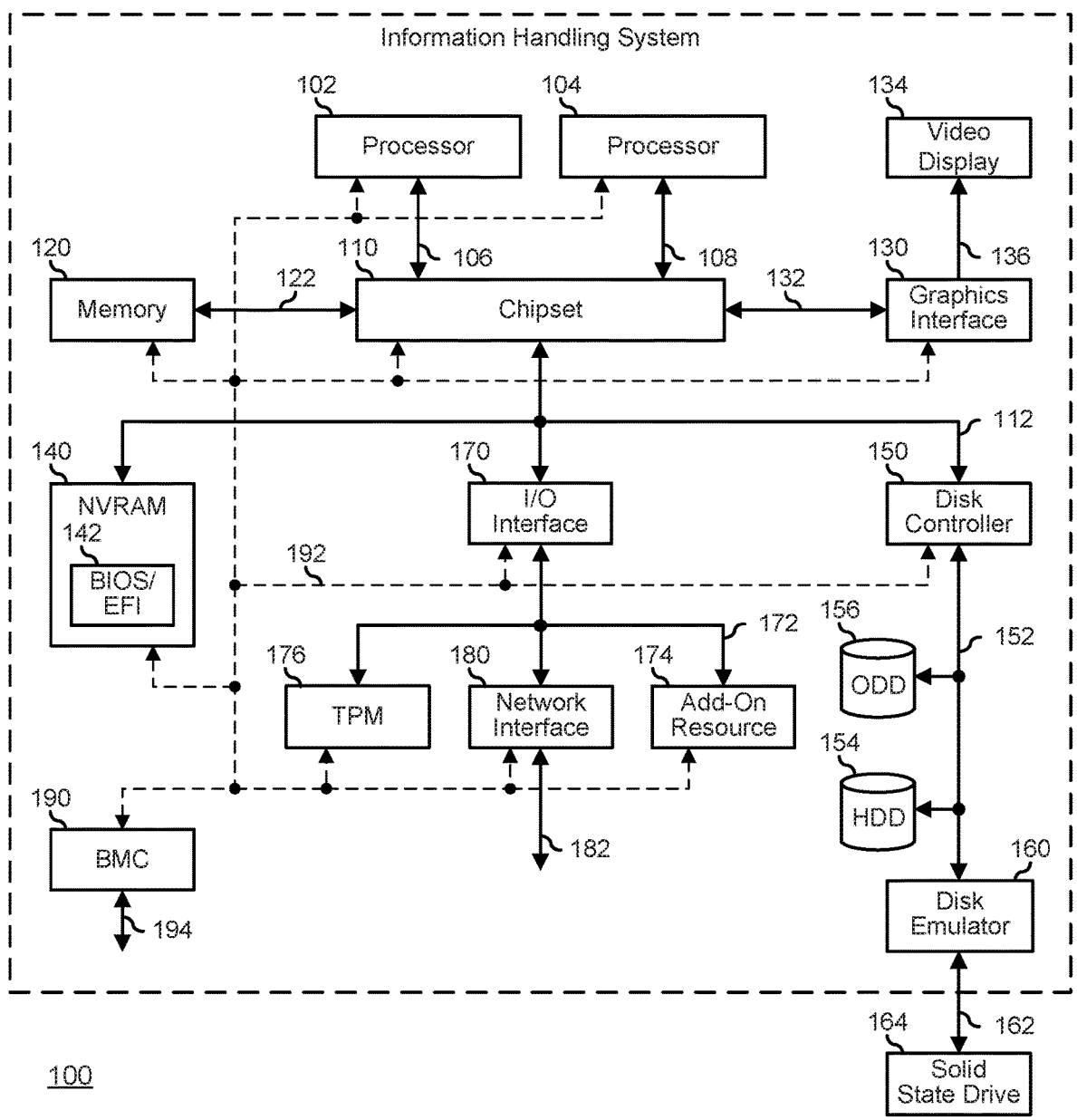
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive (ODD) 156, a disk emulator 160 connected to a solid state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof.

Network channel 182 can be connected to an external network resource (not illustrated). The network resource can include another information handling system, a data storage system, another network, a grid management system, another suitable resource, or a combination thereof. BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like.

The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like.

As used herein, out-of-band access refers to operations performed apart from a BIOS/operating system execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WS-MAN) interface, a Management Component Transport Protocol (MCTP) or a Redfish interface, various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Figure 2:
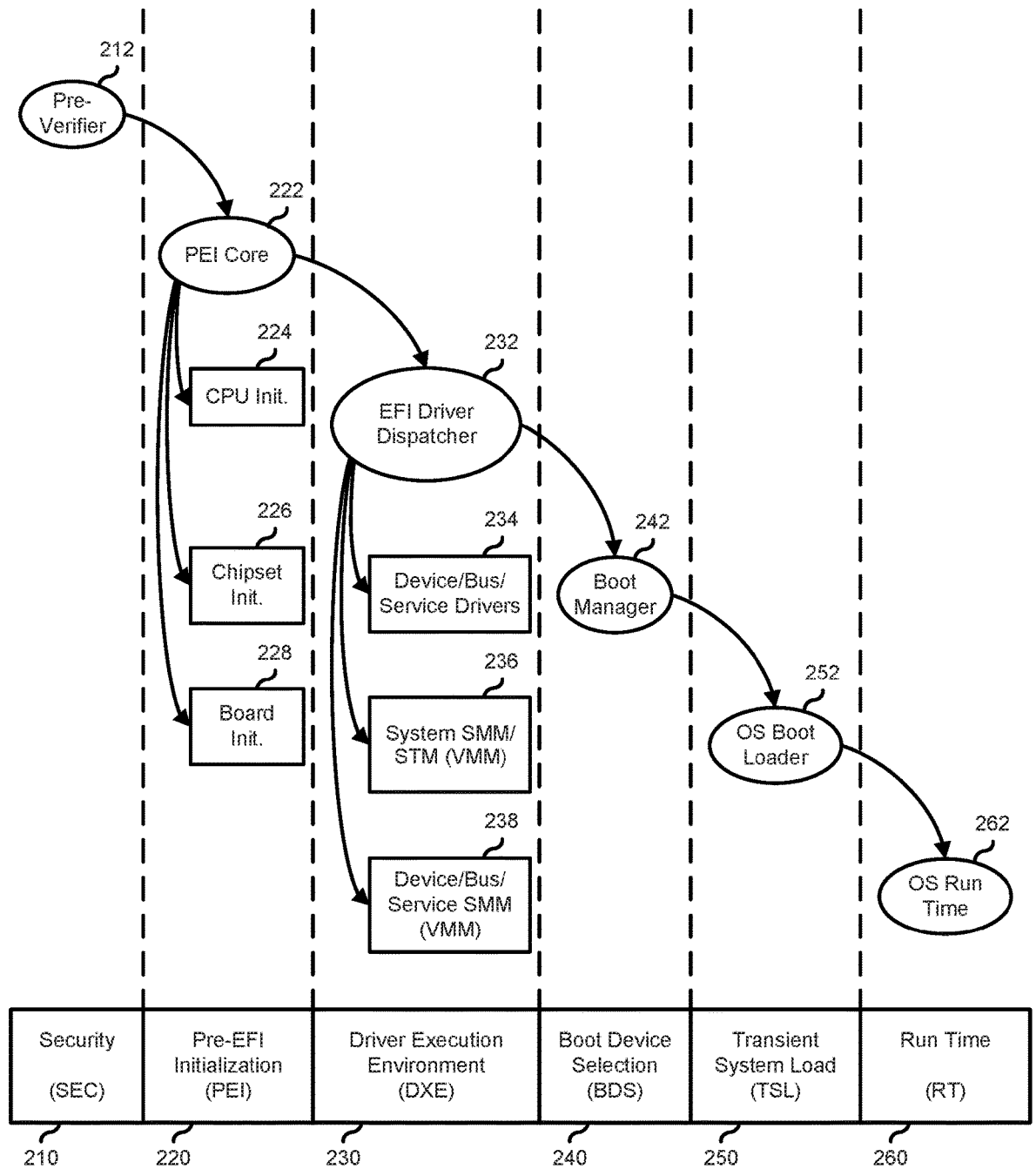
FIG. 2 is a phase diagram for the boot of an information handling system that operates using a UEFI according to another embodiment of the present disclosure.

FIG. 2 illustrates a phase diagram 200 for the boot of an information handling system that operates using a UEFI, including a security (SEC) phase 210, a pre-EFI initialization (PEI) phase 220, a driver execution environment (DXE) phase 230, a boot device selection (BDS) phase 240, a transient system load (TSL) phase 250, and a run time (RT) phase 260. SEC 210 is the first phase of a UEFI boot process on the information handling system that operates to set up a pre-verifier 212 that handles all restart events on the information handling system, and temporarily allocates a portion of memory for use during the other boot phases. Pre-verifier 212 is executed out of the firmware resident on the information handling system, and so serves as a root of trust for the system. Pre-verifier 212 passes execution to PEI 220 that executes a PEI core 222 to initialize the system memory for the information handling system. PEI core 222 includes CPU initialization 224, chipset initialization 226, and board resource initialization 228. PEI core 222 passes execution to DXE 230 that executes an EFI driver dispatcher 232 to perform device specific initializations for the information handling system, including loading device, bus, and service drivers 234, and instantiating a system SMI handler 236. EFI driver dispatcher 232 passes execution to BDS 240 that executes a boot manager 242 that identifies a boot target, and passes execution to TSL 250. TSL 250 launches an OS boot loader 252 that loads the operating system, and passes execution to the operating system at RT 260.

BIOS/UEFI code is typically stored in a Serial Peripheral Interface (SPI) read-only memory (ROM) of an information handling system. SPI ROM devices have the benefit that the data stored thereon is non-volatile, and so the data is retained when the information handling system is powered off. However, the SPI interface is typically very slow, and the capacities available for SPI ROM are typically small when compared with other volatile memory devices, such as Dynamic Random Access Memory (DRAM) Dual In-Line Memory Modules (DIMMs) or Non-Volatile Memory-Express (NVMe) SSDs. For example, a typically available SPI ROM may have a capacity of 16-32 megabytes (MB), while DIMMs and NVMe SSDs typically have capacities measured in gigabytes (GB). As such, SPI ROM devices are typically selected based upon a tradeoff between the device cost and the size of the computer firmware needed to operate the information handling system. Further, once an information handling system has been designed and produced, the size of the SPI ROM is fixed and not upgradable because the SPI ROM devices are typically mounted directly to a motherboard of the information handling system.

For this reason, the BIOS/UEFI code image size is carefully managed to fit within the size restriction imposed by the SPI ROM device in the information handling system. Thus, while increased BIOS/UEFI code functionality may be desirable, it is often difficult to justify increases in the size of the SPI ROM to accommodate the increased functionality. Some features that are typically not included in a BIOS/UEFI code image due to size constraints imposed by the SPI ROM size may include diagnostic UEFI applications which may consume upwards of one MB, a BIOS/UEFI based network stack driver which may consume upwards of one MB, a BIOS/UEFI support application for remote support and recovery services which may consume upwards of four MB, custom logo and BIOS/UEFI splash screen data which may consume upwards of one MB, or other utilities or functions, as needed or desired.

Moreover, due to the size limitation of the SPI ROM in an information handling system, the SPI ROM is typically populated only with a primary copy of the BIOS/UEFI code. In particular, this means that a recovery image of the BIOS/UEFI code is not resident on the SPI ROM in case the primary BIOS/UEFI code image becomes corrupted, and elaborate procedures are typically needed to recover from a corrupted BIOS/UEFI code image or to update to a new version of the BIOS/UEFI code image. For example, a Capsule Update is a well-established method to update BIOS/UEFI code components within an information handling system. Capsule Update allows for signed BIOS/UEFI code images to be stored in a portion of the system memory to be flashed to the SPI ROM during a warm reboot, assuming the integrity of the system memory is preserved during the warm re-boot. If there is any disruption of the system memory block that stores the new BIOS/UEFI code image before the image is flashed to the SPI ROM, the operation will fail.

Figure 3:
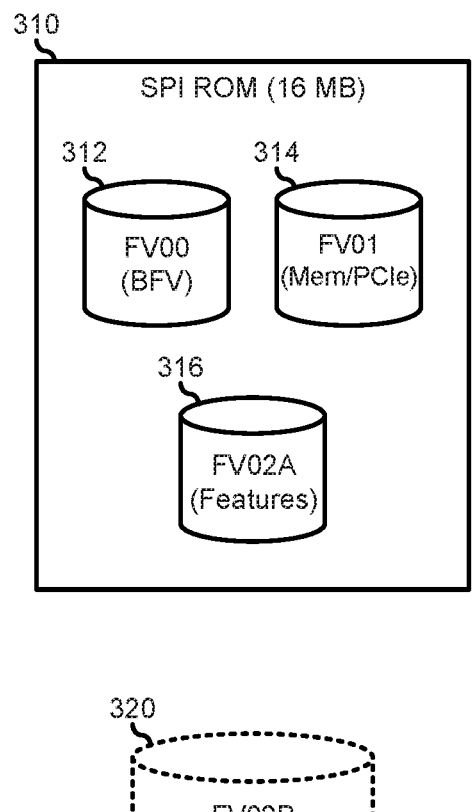
FIG. 3 is a block diagram of firmware memory architecture according to the prior art.
Figure 3:
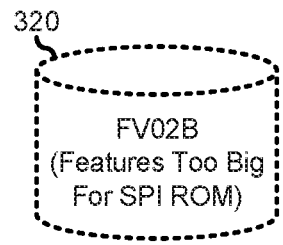

FIG. 3 illustrates a firmware memory architecture 300 for an information handling system in accordance with the prior art. Architecture 300 includes a sixteen MB capacity SPI ROM 310 that has sufficient capacity to store firmware volumes (FVs) 312, 314, and 316. FV 312 represents a boot FV00 (BFV) that includes PEI foundation code to which the pre-verifier of the SEC phase passes control at the end of the SEC phase. FV 314 represents a FV01 that includes BIOS/UEFI code to initialize system memory and to enumerate and initialize PCIe links. FV 316 represents a FV02A that includes BIOS/UEFI code to implement a subset of additional features that are small enough to fit within SPI ROM 310. Architecture 300 also includes an additional FV02B that includes BIOS/UEFI code to implement a larger subset of additional features that are desirable to have but are too large to fit within SPI ROM 310. Thus FV 320 is depicted with dashed lines because the features of FV 320 are typically not loaded and initialized in the PEI phase, but rather are stored in other non-volatile memory locations, such as disk storage, and are launched as standalone applications later in the boot process, such as at run time. Here, it will be understood that an entry point for each FV in boot partition 422 will need to be remapped in a BIOS/UEFI code mapping table to perform maintain the boot flow. The methods and practices of such entry point remapping are known in the art.

Figure 4:
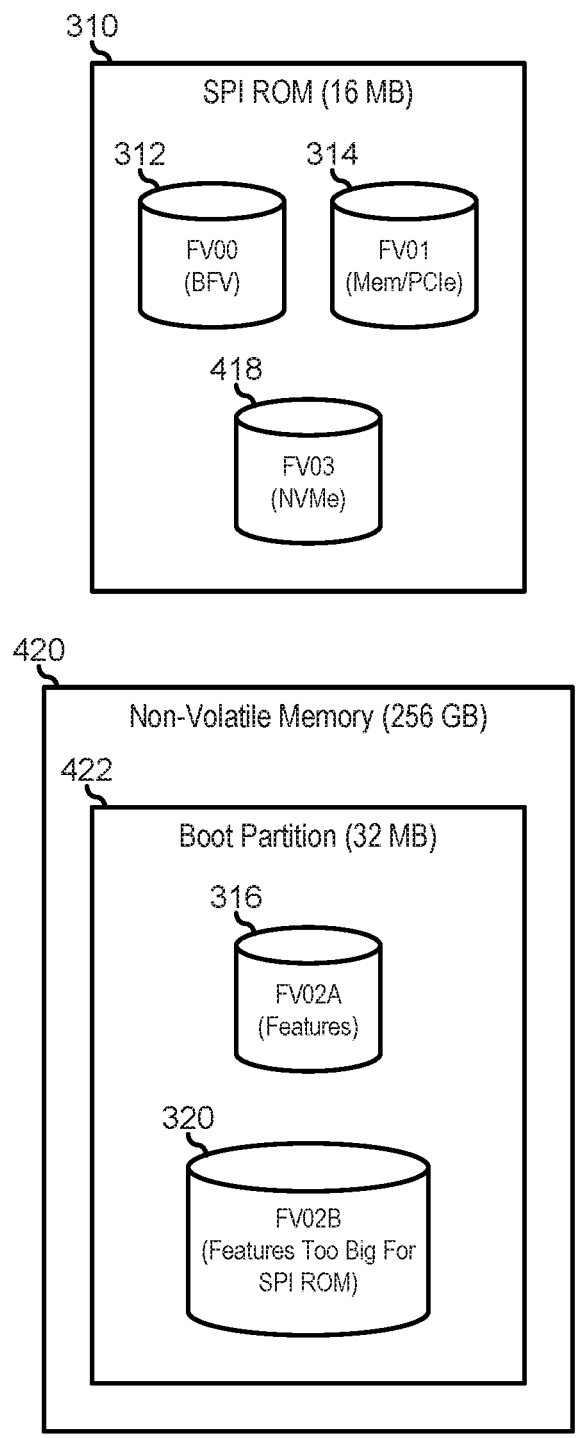
FIG. 4 is a block diagram of firmware memory architecture according to another embodiment of the present disclosure.

FIG. 4 illustrates a firmware memory architecture 400 in accordance with an embodiment of the present disclosure. Architecture 400 includes SPI ROM 310 and an NVM device 420. NVM device supports boot partitioning that can be accessed using a minimal subset of NVMe protocol features. For example, a boot partition 422 of NVM device 420 may be accessed without requiring the information handling system to allocate and configure an NVMe controller or task queues typically used to access NVMe devices. Here, SPI ROM 310 includes FV 312 and FV 314, as in architecture 300, and includes an additional FV 418. FV 418 represents an NVMe FV that accesses NVM device 420, and initializes boot partition 422 on the NVM device. Here, FVs 316 and 320 are stored non-volatilely on boot partition 422, and both of these FVs are depicted with solid lines, indicating that the features of these FVs are loaded and initialized in the PEI phase as part of the BIOS/UEFI boot code at the PEI phase. Thus, the term "boot partition" as used herein is understood in the context of NVMe devices in accordance with an NVMe 1.3 revision level specification for a partition of an NVMe device that is accessible during one or more of the PEI phase, the DXE phase, or the TSL phase of a UEFI boot process, or similar stages of a BIOS boot process. As such, the term "boot partition" as used herein is separate and distinct from a conventional use of the term "boot partition" as related to, for example, SSD or SATA hard drives, where a "boot partition" is a disk partition for storing an OS boot image that is used only by a OS boot loader during a TSL phase of the UEFI boot process, or a similar stage of the BIOS boot process.

Figure 5:
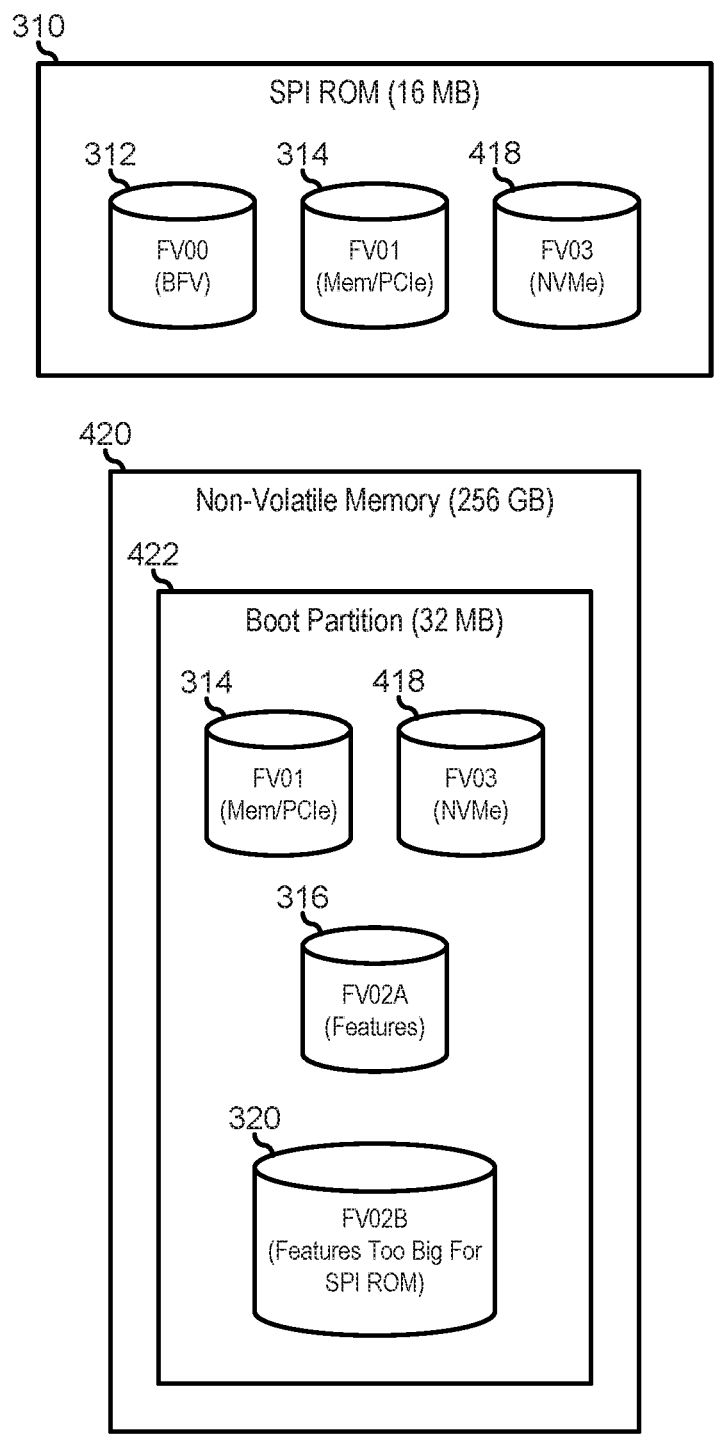
FIG. 5 is a block diagram of firmware memory architecture according to still another embodiment of the present disclosure.

With the flexibility and capacity made available in boot partition 422, other distributions and uses of the boot partition should be understood to be within the scope of the present disclosure. In particular, FIG. 5 illustrates a firmware memory architecture 500 in accordance with another embodiment of the present disclosure. Here, SPI ROM 310 includes only FV 312, and FVs 316, 216, 320, and 418 are stored non-volatilely on boot partition 422. In this way, the BIOS/UEFI code embodied in FVs 314, 316, 320, and 418 can be run out of boot partition 422 directly, thereby speeding up the boot process and obviating the need to shadow the BIOS/UEFI code to faster memory. The methods and practices for creating, manipulating, and moving FVs within a BIOS/UEFI code are known in the art, and will not be described further herein except as needed to describe the present embodiments. It will be further understood that the mix of FVs to be retained in a SPI ROM, versus those FVs that are stored and run out of an NVMe boot partition, as shown in the present embodiments, are exemplary, and that other mixes of FVs between a SPI ROM and an NVMe boot partition may be determined as needed or desired.

Figure 6:
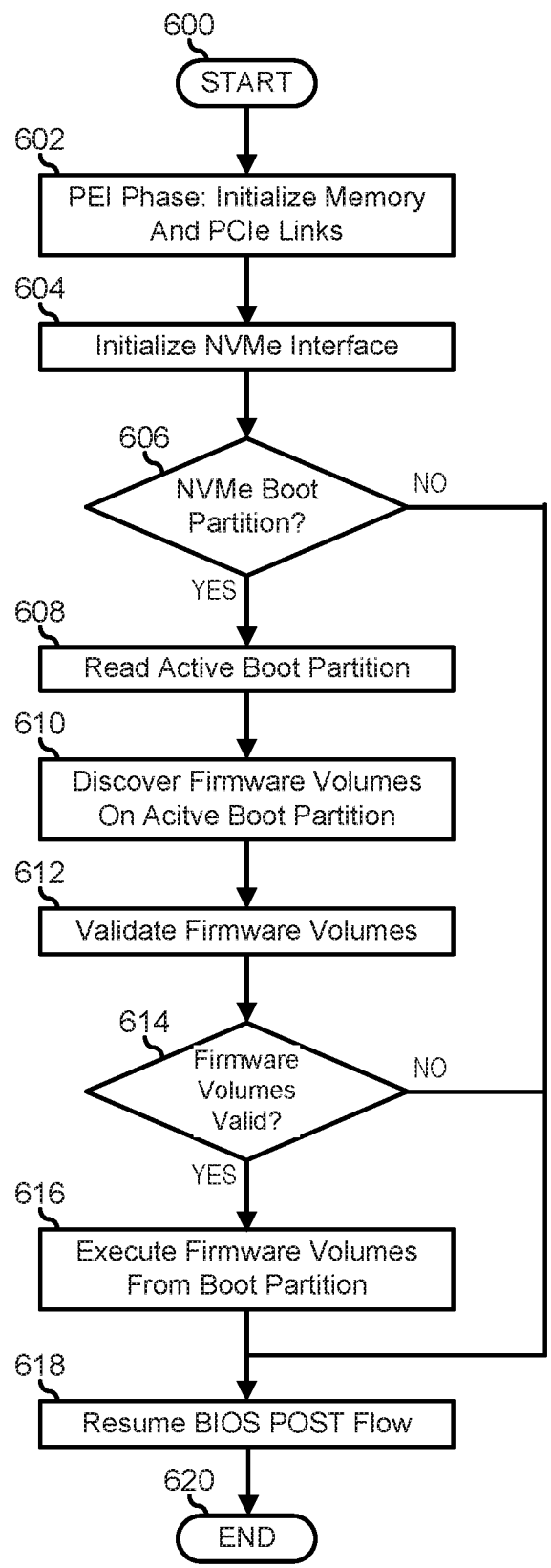
FIG. 6 is a flowchart illustrating a method of storing and accessing firmware volumes on a non-volatile memory device according to an embodiment of the present disclosure.

FIG. 6 illustrates a method of storing and accessing FVs on an NVM device, starting at block 600. An information handling system is booted and a PEI phase is executed wherein system memory is initialized and PCIe links are enumerated and initialized in block 602. An NVMe interface is initialized in block 604. A decision is made as to whether or not an NVM device includes a boot partition in decision block 606. If not, the "NO" branch of decision block 606 9 is taken and the method proceeds to block 618 where the normal BIOS POST flow is resumed. If the NVM device includes a boot partition, the "YES" branch of decision block 606 is taken and an active boot partition of the NVM device is read in block 608. FVs are discovered on the active boot partition of the NVM device in block 610. The discovered FVs are validated in block 612, and a decision is made as to whether or not the FVs are valid in decision block 614. If not, the "NO" branch of decision block 614 is taken and the method proceeds to block 618 where the normal BIOS POST flow is resumed. If the FVs are valid, the "YES" branch of decision block 614 is taken and the FVs are executed from the boot partition, the method proceeds to block 618 where the normal BIOS POST flow is resumed, and the method ends at block 620.

An algorithm to create extended BIOS/UEFI code FV image files is:

In GenFv get information from FDF file for creating extend firmware volumes.

[FV.BiosExtendFv]
BlockSize = 0x10000
FvAlignment = 16
ERASE_POLARITY = 1
MEMORY_MAPPED = TRUE -continued

```
STICKY_WRITE = TRUE
LOCK_CAP = TRUE
LOCK_STATUS = TRUE
WRITE_DISABLED_CAP =
TRUE WRITE_ENABLED_CAP = TRUE
WRITE_STATUS = TRUE
WRITE_LOCK_CAP = TRUE
WRITE_LOCK_STATUS = TRUE
READ_DISABLED_CAP = TRUE
READ_ENABLED_CAP = TRUE
READ_STATUS = TRUE
READ_LOCK_CAP = TRUE
READ_LOCK_STATUS = TRUE
FILE FV_IMAGE = E5C4BC4F-4766-F69D-DD48-7587F8A94BFF {
    SECTION GUIDED {
        SECTION FV_IMAGE = BiosNVMeExtendedVolume
} }
```

Figure 7:
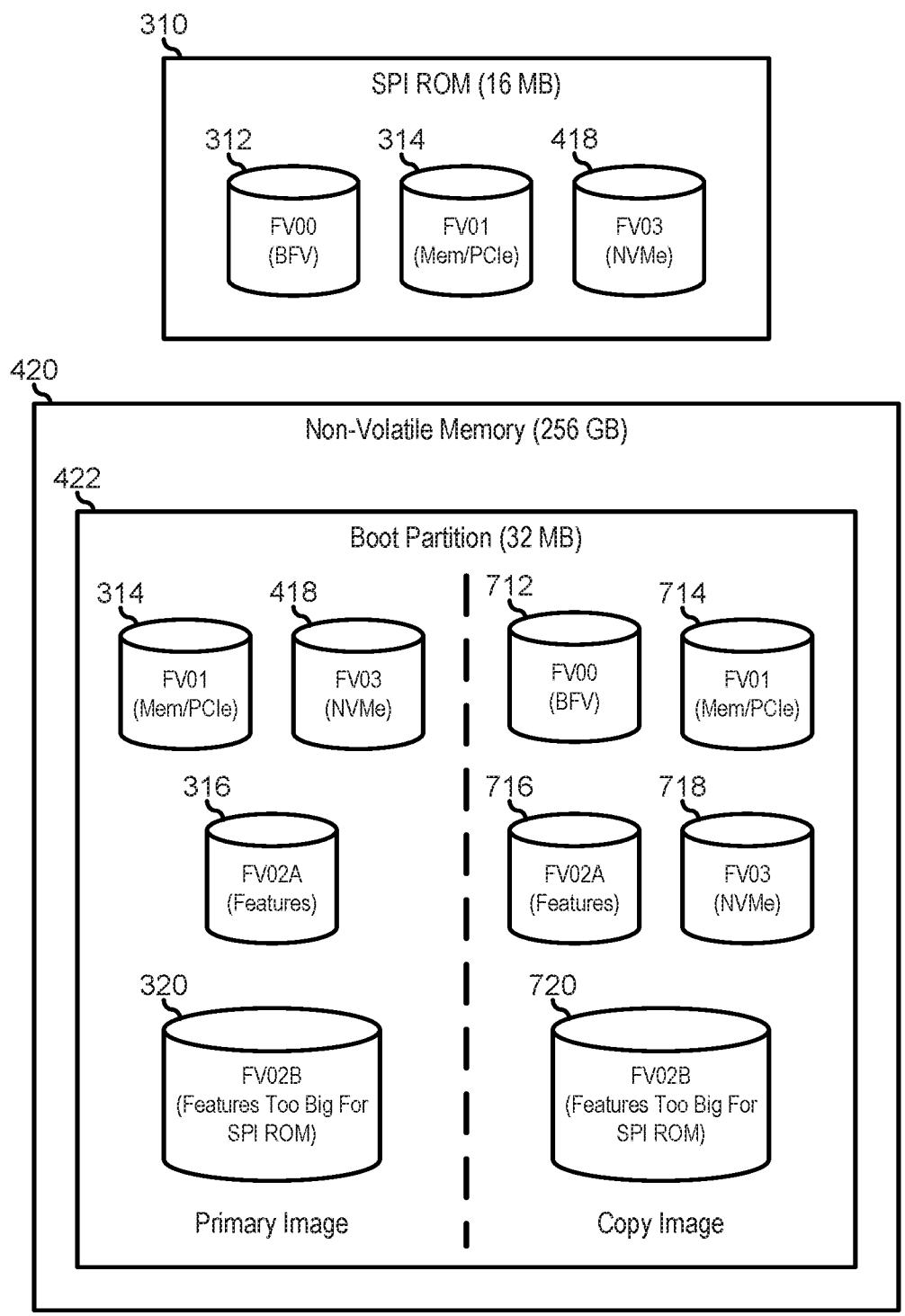
FIG. 7 is a block diagram of firmware memory architecture according to still another embodiment of the present disclosure.

FIG. 7 illustrates a firmware memory architecture 700 in accordance with another embodiment of the present disclosure. Here, SPI ROM 310 includes FV 312, 314, and 418. In addition, copies of FVs 314 and 418, and FVs 316 and 320 are stored non-volatilely on boot partition 422, as in architecture 500. In addition, boot partition 422 stores image copies of the primary FVs: a copy FV 712 of FV 312, a copy FV 714 of FV 314, a copy FV 716 of FV 316, a copy FV 718 of FV 418, and a copy FV 720 of FV 320. In this way, a copy of the present BIOS/UEFI code is stored non-volatilely on boot partition 422, such that, if any element of the BIOS/UEFI code becomes corrupted or otherwise needs to be restored or replaced, there is no need for a BIOS recovery utility to need to download and copy the recovery version of the BIOS/UEFI code, as is done in a conventional BIOS recovery utility, but otherwise, the conventional BIOS recovery utility may be utilized. In particular, FV 712 may not represent a bootable version of FV 312, but is present in boot partition 422 for recovery purposes.

Figure 8:
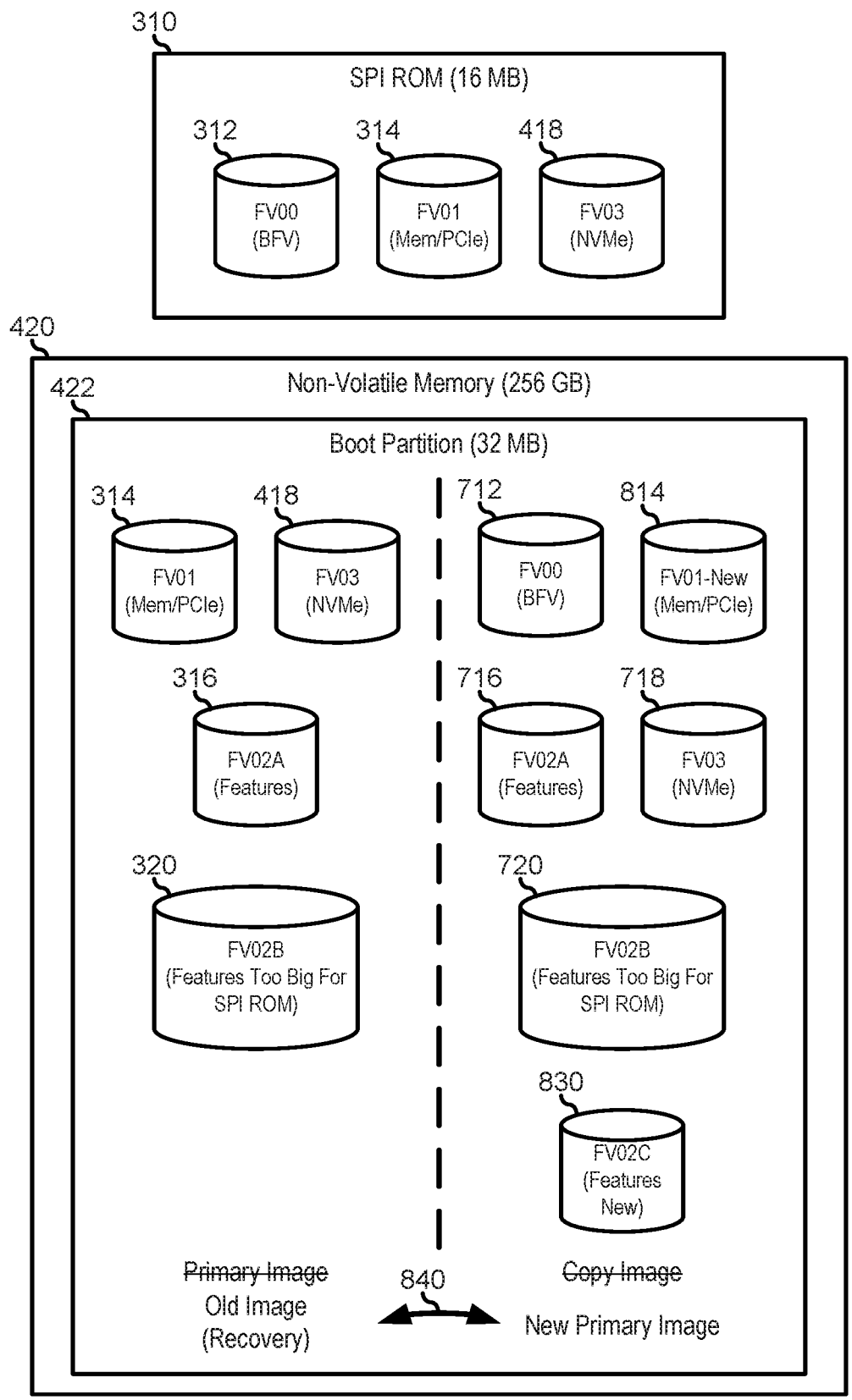
FIG. 8 is a block diagram of firmware memory architecture according to still another embodiment of the present disclosure.

Additionally, FIG. 8 illustrates a firmware memory architecture 800 in accordance with another embodiment of the present disclosure. Here, SPI ROM 310 includes FV 312, 314, and 418. In addition, copies of FVs 314 and 418, and FVs 316 and 320 are stored non-volatilely on boot partition 422, and FVs 712, 716, 718, and 720 are stored non-volatilely on the copy portion of the boot partition, as in architecture 700. However, instead of storing FV 714, new FVs 814 and 840 are stored non-volatilely on the copy portion of boot partition 422. FV 814 represents a modified version of the BIOS/UEFI code to initialize system memory and to enumerate and initialize PCIe links FV01-New. FV 830 represents new features of the BIOS/UEFI code FV02C in addition to the features included in FV02A and FV02B. After any modifications to the BIOS/UEFI code that are needed or desired are stored to the copy portion of boot partition 422, a BIOS utility operates 840 to swap the designations of the primary image and the copy image, such that the copy image is maintained as a new primary image, and the old primary image is maintained as an old/recovery image. Here, it will be understood that an entry point for each FV in the new primary image will need to be remapped in a BIOS/UEFI code mapping table to perform the swap of the copy image and the primary image. The methods and practices of such entry point remapping are known in the art and, will not be further described further herein except as needed to describe the present embodiments.

Figure 9:
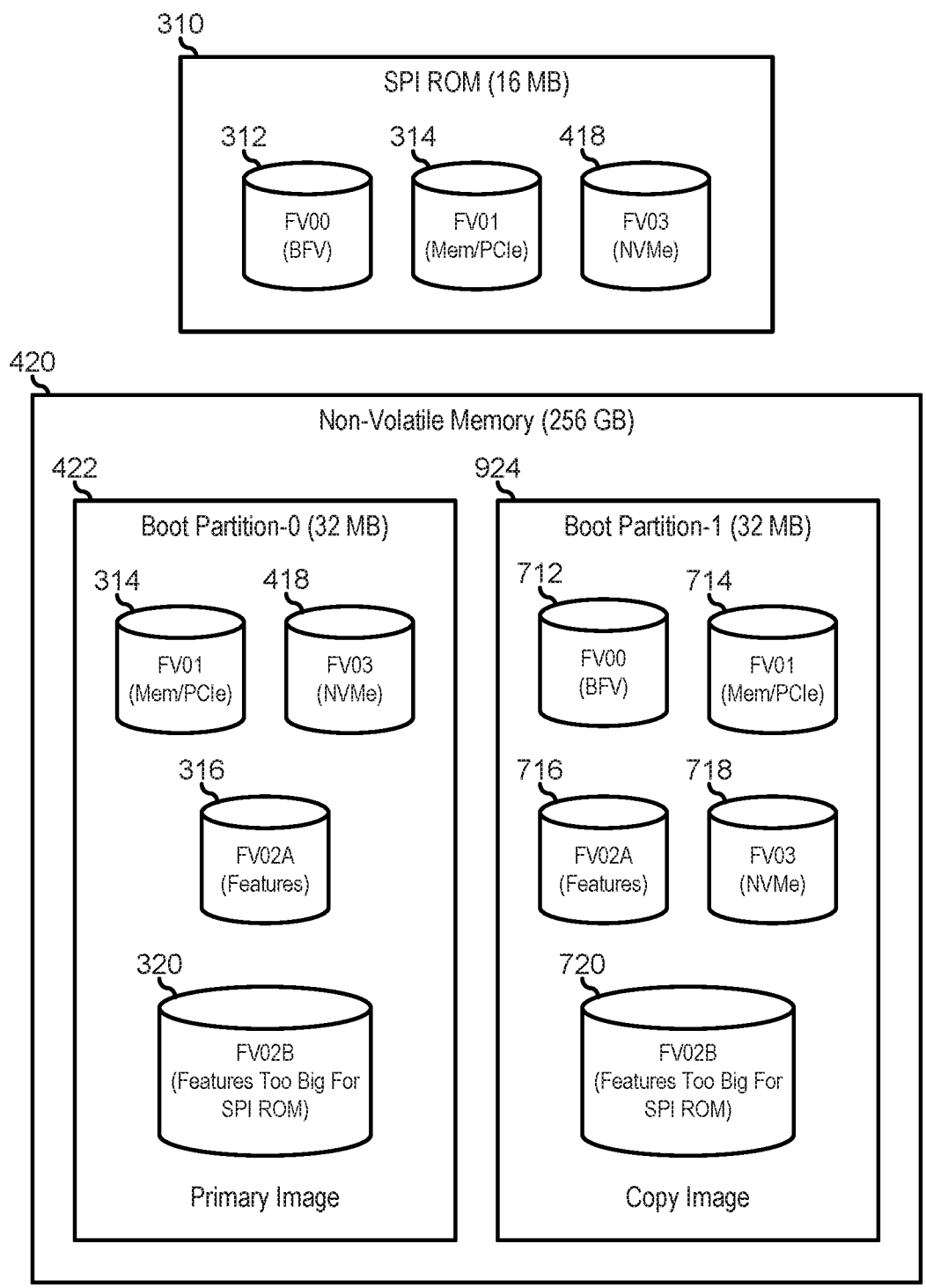
FIG. 9 is a block diagram of firmware memory architecture according to still another embodiment of the present disclosure.

FIG. 9 illustrates a firmware memory architecture 900 in accordance with another embodiment of the present disclosure. Architecture 900 is similar to architecture 600, except that here, NVM device 420 implements two or more boot partitions, including a second boot partition 924. Here further, instead of storing copy FVs 712, 714, 716, 718, and 720 on a copy portion of boot partition 422, the copy FVs are stored non-volatilely on boot partition 924. In this embodiment, only a pointer to boot partition 924 needs to be modified in a BIOS/UEFI code mapping table to point to boot partition 924 when swapping the copy image to the primary image. Note that in the embodiments shown in FIGS. 5 and 7-9, boot partition 422 may also include FV 312 in order to provide a recovery option to reproduce the contents of SPI ROM 310, as needed or desired.

Figure 10:
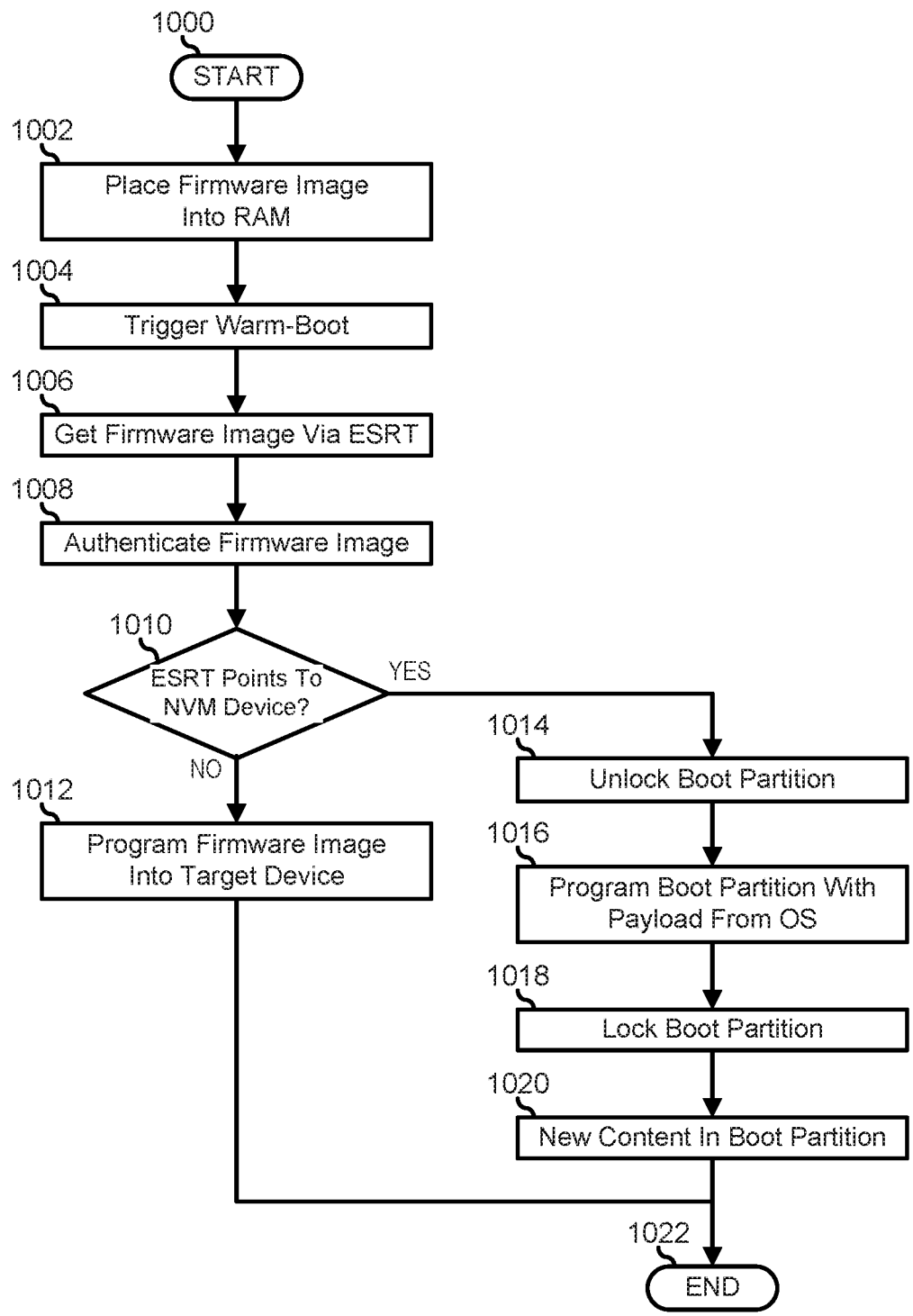
FIG. 10 is a flowchart illustrating a method for a modified Capsule Update that utilizes an NVM device boot partition according to an embodiment of the present disclosure.

FIG. 10 illustrates a method for a modified Capsule Update that utilizes an NVM device boot partition, starting at block 1000. A new firmware image is stored into system RAM in block 1002. BIOS triggers a warm-boot in block 1004. BIOS accesses the firmware image via an EFI System Resource Table (ESRT) in block 1006, and authenticates the firmware image in block 1008. A decision is made as to whether or not the ESRT points to an NVM device in decision block 1010. If not, the "NO" branch of decision block 1010 is taken, the firmware image from RAM is programmed into the target device in block 1012, and the method ends in block 1022. If the ESRT points to an NVM device, the "YES" branch of decision block 1010 is taken and the BIOS unlocks the boot partition of the NVM device in block 1014. The BIOS programs the boot partition with the firmware image from the OS in block 1016. The BIOS locks the boot partition in block 1018. The new firmware image in the boot partition is accessed in the boot partition in block 1020 and the method ends in block 1022.

Figure 11:
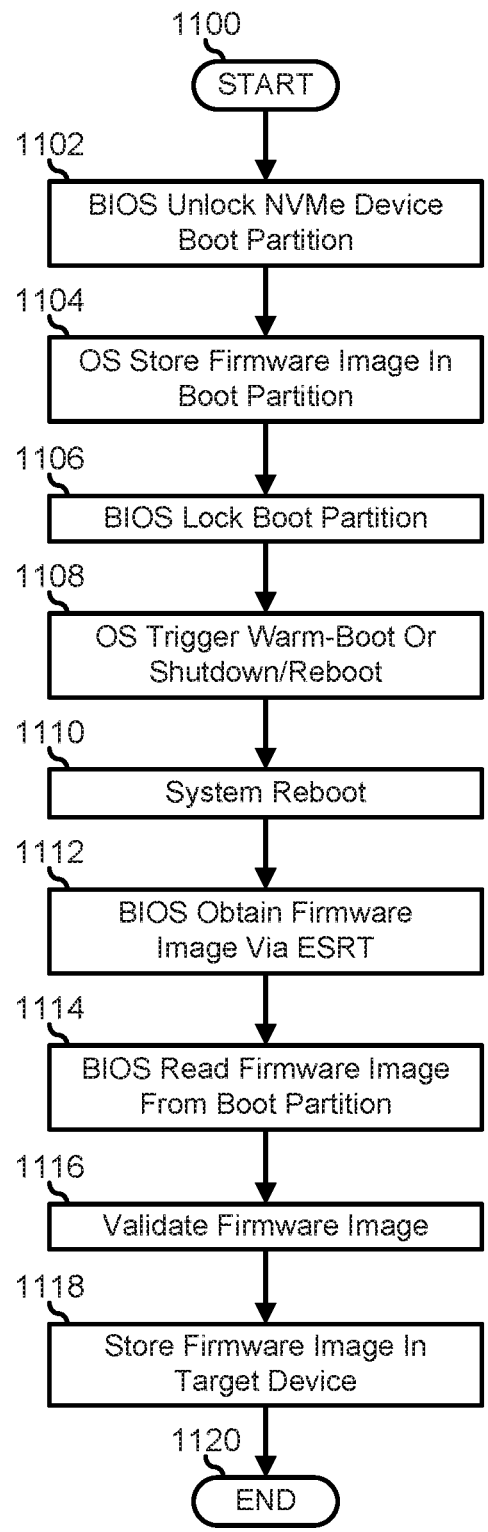
FIG. 11 is a flowchart illustrating a method for a modified Capsule Update that utilizes an NVM device boot partition according to another embodiment of the present disclosure.

FIG. 11 illustrates another embodiment of a modified Capsule Update starting at block 1100. BIOS unlocks a boot partition of an NVM device in block 1102. The OS stores the firmware image in the boot partition in block 1104 and BIOS locks the boot partition in block 1106. The OS triggers either a warm reboot or a system shutdown and reboot in block 1108. The system reboots in block 1110. BIOS obtains the firmware image target location from the ESRT in block 1112, reads the firmware image from the boot partition in block 1114, and validates the boot partition in block 1116. The BIOS stores the firmware image to the target device in block 1118 and the method ends in block 1120.

Figure 12:
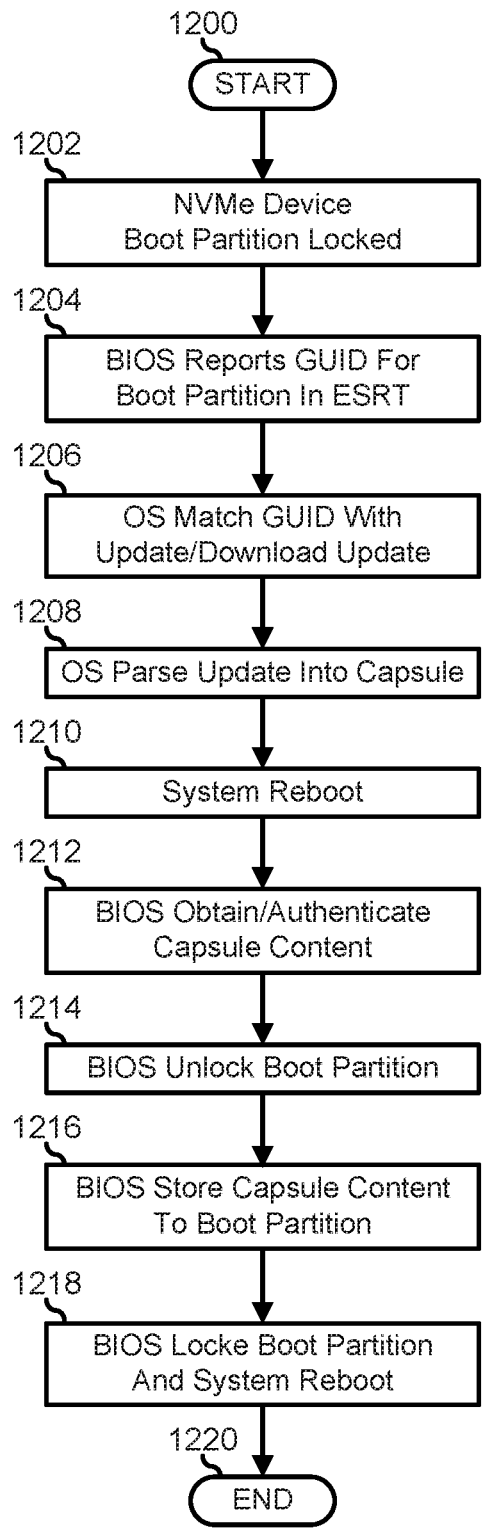
FIG. 12 is a flowchart illustrating another method for a modified Capsule Update that utilizes an NVM device boot partition according to an embodiment of the present disclosure.

FIG. 12 illustrates another embodiment of a modified Capsule Update starting at block 1200. A BIOS locks a boot partition of an NVM device in block 1102. In locking the boot partition, the BIOS can prevent writes to the boot partition by an OS or other run time agents operating on the information handling system. The BIOS reports a Globally Unique Identifier (GUID) associated with the boot partition in the ESRT in block 1204. When a new or updated FV is available, the OS matches the GUID from the ESRT with an update package on an update server, and if the update package matches the GUID, the OS downloads the update package in block 1206. The OS parses the update package and prepares the update package in a capsule in block 1206. The information handling system is rebooted in block 1210, and, pursuant to the capsule update process, the BIOS obtains the capsule and authenticates the capsule content in block 1212. If the capsule content is successfully authenticated, the BIOS unlocks the boot partition in block 1214 and stores the new or updated FV from the capsule content to the boot partition in block 1216. The BIOS relocks the boot partition and triggers a system reboot in block 1218 and the method ends in block 1220. Upon rebooting, the BIOS then utilizes the new or updated FV from the boot partition as described above.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a processor;
   a Basic Input/Output System (BIOS) read-only memory (ROM) device to store a first firmware volume of BIOS code for the information handling system; and
   a non-volatile memory device including a first boot partition to store a second firmware volume of the BIOS code, and a copy of the first firmware volume, wherein the processor executes the first and second firmware volumes during Unified Extensible Firmware Interface (UEFI) boot process.

2. The information handling system of claim 1, wherein a sum of a size of the first firmware volume and a size of the second firmware volume is greater than a capacity of the BIOS ROM device.

3. The information handling system of claim 1, wherein in executing the second firmware volume during the UEFI boot process, the processor executes the second firmware volume from the first boot partition.

4. The information handling system of claim 1, wherein the non-volatile memory device includes a second boot partition.

5. The information handling system of claim 4, wherein the second boot partition stores a copy of the first firmware volume.

6. The information handling system of claim 5, wherein the processor further:
   stores a third firmware volume to the second boot partition;
   reboots the information handling system; and
   executes the copy of the first firmware volume and the third firmware volume during the UEFI reboot process.

7. The information handling system of claim 6, wherein the processor executes the copy of the first firmware volume and the third firmware volume from the second boot partition.

8. The information handling system of claim 6, wherein the third firmware volume is a modified version of the second firmware volume.

9. The information handling system of claim 1, wherein the non-volatile memory device is a Non-Volatile Memory-Express device.

10. A method, comprising:
    storing a first firmware volume in a Basic Input/Output System (BIOS) read-only memory (ROM) device of an information handling system;

storing a copy of the first firmware volume and a second firmware volume in a first boot partition of a non-volatile memory device of the information handling system; and executing, by the information handling system, the first and second firmware volumes during a Unified Extensible Firmware Interface (UEFI) boot process.

11. The method of claim 10, wherein a sum of a size of the first firmware volume and a size of the second firmware volume is greater than a capacity of the BIOS ROM device.

12. The method of claim 10, wherein in executing the second firmware volume during the boot process, the method further comprises:

executing, by the processor, the second firmware volume from the first boot partition.

13. The method of claim 10, wherein the non-volatile memory device includes a second boot partition.

14. The method of claim 13, further comprising:

storing a copy of the first firmware volume to the second boot.

15. The method of claim 14, further comprising:

storing a third firmware volume to the second boot partition;

rebooting the information handling system; and executing, by the processor, the copy of the first firmware volume and the third firmware volume during the PEI phase of the UEFI reboot process.

16. The method of claim 15, wherein in executing the copy of the first firmware volume and the third firmware volume, the method further comprises:

executing, by the processor, the copy of the first firmware volume and the third firmware volume from the second boot partition.

17. The method of claim 15, wherein the third firmware volume is a modified version of the second firmware volume.

18. The method of claim 10, wherein the non-volatile memory device is a Non-Volatile Memory-Express device.

* * * * *